March 15, 1960  G. L. A. DEVOS  2,928,263
HOMOKINETIC UNIVERSAL JOINT
Original Filed July 23, 1957

*INVENTOR*
GASTON LOUIS ARTHUR DEVOS

BY Karl W. Flocks

ATTORNEY

United States Patent Office 2,928,263
Patented Mar. 15, 1960

2,928,263

HOMOKINETIC UNIVERSAL JOINT

Gaston Louis Arthur Devos, Paris, France

Original application July 23, 1957, Serial No. 673,717, now Patent No. 2,914,931, dated December 1, 1959. Divided and this application July 29, 1959, Serial No. 830,435

Claims priority, application France August 27, 1956

4 Claims. (Cl. 64—21)

The present application is a division of co-pending application No. 673,717, filed July 23, 1957, now Patent No. 2,914,931, entitled Homokinetic Universal Joint.

The present invention relates in general to homokinetic universal joints, that is, couplings adapted to connecting shafts rotating at an angle which is either constant or variable through the medium of steel balls placed in intersecting races (Bendix, Rzeppa, Weiss, etc.), of the type used notably for actuating the driving wheels of automotive vehicles and also in the transmission of motion between parallel offset shafts.

In certain known types of universal joints a ball retainer is inserted between the heads of the movable shafts to keep the balls in position, and either four balls constitute a minimum to permit the operation of the device, or the balls offset from the geometrical center of the joint operate under abnormal shearing angle conditions; on the other hand, the longitudinal spacing between the shafts is ensured only when these shafts move towards each other, not when an effort tends to separate them, or it is also impossible to permit slight variations in the longitudinal spacing of the shafts in order to obtain "extensible" joints; finally, these known universal joints are not always perfectly homokinetic (which means that the joint is designed to maintain equal speeds of the driving and driven shafts for any angle between the shafts) and the permissible angular movement between the rotating shafts is relatively small.

Now it is the essential object of this invention to provide a strictly homokinetic universal joint operating very correctly between shafts set at an angle, even when the shafts depart considerably from their relative alignment, with the minimum wear of its component elements, this improved joint having a relatively simple structure reducing machining operations to a minimum, so that its fabrication is easier and more economical than that of any other known joint of this character. This object may be realized by employing the following means:

The assembly comprises two outer balls and a central ball moving and playing in races and cups which can be easily machined and are so disposed that the outer balls roll under a reduced angle of shearing and that the central ball operates under frictional contact conditions, the torque being transmitted by the central ball together with a different lateral ball for each direction of rotation.

Other features and advantages of the invention will become apparent from the following description referring to the attached drawings forming part of this specification and illustrating diagrammatically by way of example a few embodiments of the invention.

Figure 1:
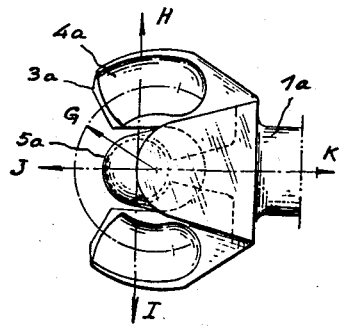
Figure 1 is a lateral view showing one half of a joint constructed in accordance with the teachings of this invention and having curbed ball races displaced longitudinally relative to the geometrical center of the joint.
Figure 2:
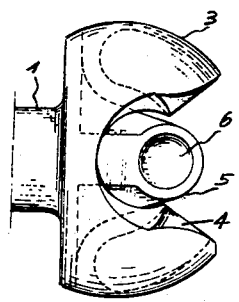
Figure 2 is a side view of a first shaft end of an embodiment of the invention in which the races are curved and markedly offset relative to the geometrical center of the joint and in which the balls are independent of each other.
Figure 3:
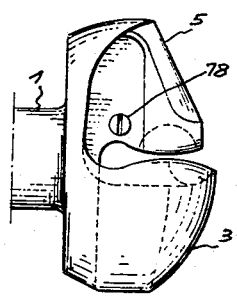
Figure 3 is a plan view of the shaft end of Fig. 2.
Figure 4:
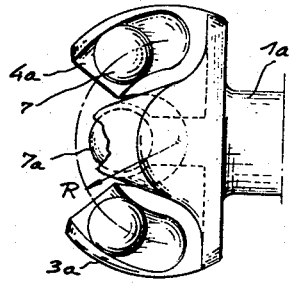
Figure 4 is a side view of the other ball-carrying shaft end.
Figure 5:
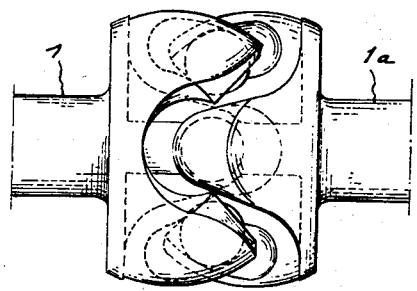
Figure 5 is a view of the shaft ends of Figs. 2 and 4 assembled.
Figure 6:
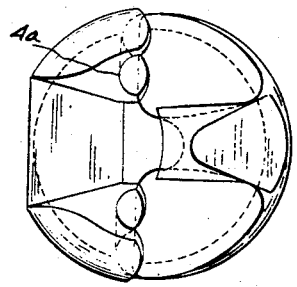
Figure 6 is a front view of the shaft end of Fig. 4.

Referring now to the drawings, a homokinetic universal joint according to this invention comprises a first shaft end 1 having two lateral arms 3 and a central head 5, and another shaft end 1a having two lateral arms 3a and a central head 5a. These arms 3, 3a have formed therein curved ball races 4, 4a of semi-cylindrical section and centered at G, somewhat to the rear of the geometrical center of the joint, which lies at the intersection of the axes J—K, H—I. The ends 1 and 1a include the central heads 5, 5a which have formed therein part-spherical cavities or cups 6 to which the center is also the geometrical center of the joint. Two lateral balls 7 engage the races 4, 4a and another central ball 7a is received in the cups 6. With this arrangement, the shafts 1, 1a are centered in the axial and longitudinal directions by the central ball 7a, the torque is transmitted through this ball 7a and, according to the direction of rotation, through one or the other lateral balls 7. Whatever the relative angular position of the shafts 1, 1a, the centers of the three balls are aligned along a geometrical axis through the geometrical center of the joint, said geometrical axis being directed by the lateral balls 7 on the bisecting plane of the shafts; it is this condition that determines the homokinetic property of the universal joint of this invention.

The setting of the lateral balls 7 on the bisecting plane of the shafts is ensured by the shearing stress and by the hinge-like movement of the races 4a. When the shafts 1, 1a are in axial alignment with each other, the device rotates as a unit without any relative displacement of the lateral balls 7; if the shafts 1, 1a incline to each other the lateral balls 7 move in the races 4a and the central ball 7a oscillates between the part-spherical cups 6, the centers of said three balls remaining constantly aligned along a geometrical axis through the geometrical center of the joint.

As regards Figs. 2 to 6 the center R of the curved races 4, 4a is displaced from the geometrical center of the joint to prevent the lateral balls 7 from escaping during the angular movements of the joint members. A screw 78 is provided to reduce the maximum angular relative inclination of the shafts after the ball mounting, the arm 3a engaging this screw so that the lateral balls 7 remain in their corresponding races 4, 4a and cannot move out therefrom.

It is to be noted that in Figs. 2 to 6 the amount by which the center R of the curved races is displaced from the geometrical center is substantially greater than in the instance of Fig. 1.

Although the above description and the accompanying drawings relate to two typical embodiments of the invention, it will be readily understood that these are given by way of example only and should not be construed as limiting the field of this invention as many modifications may be brought to these embodiments without departing from the scope of the invention as set forth in the appended claims.

What I claim as new is:

1. A universal joint adapted to maintain equal speeds of driving and driven shafts for any angle between the said shafts, comprising a first shaft end and a second shaft end each formed with a central head and with two lateral arms, a curved outer ball race formed in each of said lateral arms symmetrically to the ball race of the other lateral arm, a lateral ball received in said outer ball races in their assembled condition, a part-spherical hollow cup formed in said central head and receiving a central ball constituting the geometrical center of the joint end ensuring the axial and longitudinal centering of said first and second shaft ends, the center of each curved ball race being displaced relative to the geometrical center of the joint in its assembled condition to an extent sufficient to prevent said outer balls from escaping when the angle between the movable shafts is minimum.

2. A universal joint adapted to maintain equal speeds of driving and driven shafts for any angle between the said shafts, comprising a first shaft end and a second shaft end each formed with a central head and with two lateral arms comprising curved ball races, the ball race formed by one lateral arm of one shaft end juxtaposed to the corresponding lateral arm of the other shaft end being symmetrical to the ball race formed by the juxtaposition of the remaining two lateral arms, an outer ball inserted in each of said ball races in a shearing position, a part-spherical hollow cup formed in said central head and receiving a central ball, constituting the geometrical center of the joint, the centers of the three balls being aligned along a geometrical axis through the geometrical center of the joint while ensuring the axial and longitudinal centering of said first and second shaft ends, whereby said axis is constantly held by said shear-stressed outer balls in the bisecting plane of said movable shafts through the geometrical center of the joint irrespective of the relative angular position of said shafts.

3. A universal joint adapted to maintain equal speeds of driving and driven shafts for any angle between said shafts comprising a first shaft end and a second shaft end having variable relative angular positions, a central ball, the center of which constitutes the geometrical center of the joint, two lateral balls, said shafts being each provided with three arms in which are formed ball races, at least two of which are incurved and of a semi-cylindrical section, said three balls being housed between said ball races, one ball to each ball race, the centers of said lateral balls being held in a plane bisecting the shafts through the geometrical center of the joint, and the torque being transmitted by the central ball together with a different lateral ball for each direction of rotation.

4. The joint of claim 3 wherein the ball races for the central ball are hemi-spherical in shape, whereby the central ball besides acting as a torque transmitting member centers the shafts axially and longitudinally.

References Cited in the file of this patent

UNITED STATES PATENTS

| | | |
|---|---|---|
| 1,522,351 | Weiss | Jan. 6, 1925 |
| 1,774,578 | Weiss | Sept. 2, 1930 |
| 2,737,790 | Bellomo | Mar. 13, 1956 |

FOREIGN PATENTS

| | | |
|---|---|---|
| 565,099 | Germany | Nov. 26, 1932 |